United States Patent
Moncomble (10) Patent No.: US 11,410,555 B2
(45) Date of Patent: Aug. 9, 2022

(54) METHOD FOR MONITORING THE AREA SURROUNDING A FIRST ELEMENT LOCATED ON A CIRCULATION ROUTE, AND ASSOCIATED SYSTEM

(71) Applicant: ORANGE, Issy-les-Moulineaux (FR)

(72) Inventor: Ghislain Moncomble, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/956,175

(22) PCT Filed: Dec. 6, 2018

(86) PCT No.: PCT/FR2018/053142
§ 371 (c)(1),
(2) Date: Jun. 19, 2020

(87) PCT Pub. No.: WO2019/122573
PCT Pub. Date: Jun. 27, 2019

(65) Prior Publication Data
US 2020/0334986 A1    Oct. 22, 2020

(30) Foreign Application Priority Data

Dec. 22, 2017 (FR) ..................... 1763183

(51) Int. Cl.
*G08G 1/16* (2006.01)
*G01S 17/931* (2020.01)
*G01S 13/931* (2020.01)

(52) U.S. Cl.
CPC ............ *G08G 1/161* (2013.01); *G01S 13/931* (2013.01); *G01S 17/931* (2020.01); *G08G 1/166* (2013.01)

(58) Field of Classification Search
None
See application file for complete search history.

(56) References Cited

U.S. PATENT DOCUMENTS 6,211,777 B1 * 4/2001 Greenwood ............. B60Q 1/52
                                                                  180/272
8,370,056 B2 * 2/2013 Trombley ............... G08G 1/164
                                                                  701/301

(Continued)

FOREIGN PATENT DOCUMENTS

DE     102014008578 A1    12/2015

OTHER PUBLICATIONS

English translation of the Written Opinion of the International Searching Authority dated May 16, 2019 for corresponding International Application No. PCT/FR2018/053142, filed Dec. 6, 2018.

(Continued)

*Primary Examiner* — Chico A Foxx
(74) *Attorney, Agent, or Firm* — David D. Brush; Westman, Champlin & Koehler, P.A.

(57) ABSTRACT

A method for monitoring an environment of a first element positioned on a circulation route, implemented by a system including at least a first terminal associated with the first element. The method includes: detecting a second element; searching for the second element detected in a list of neighboring elements positioned around the first element; if the list does not include the detected second element: recording a geolocation position of said detected second element, and determining an element, called a third element, for which presence of the detected second element can have an impact.

10 Claims, 5 Drawing Sheets

(56) References Cited

U.S. PATENT DOCUMENTS

| | | | |
|---|---|---|---|
| 8,547,249 B2 | 10/2013 | David et al. | |
| 8,639,426 B2* | 1/2014 | Dedes | G01C 21/3697 |
| | | | 701/65 |
| 9,047,778 B1* | 6/2015 | Cazanas | G08G 1/166 |
| 9,111,453 B1* | 8/2015 | Alselimi | G01S 19/14 |
| 9,485,747 B1* | 11/2016 | Rodoper | G01S 5/00 |
| 9,517,755 B1* | 12/2016 | Chen | B60T 7/22 |
| 9,633,562 B2* | 4/2017 | Nathanson | H04L 69/164 |
| 10,157,544 B2 | 12/2018 | Altinger et al. | |
| 10,429,504 B2* | 10/2019 | Choi | G01S 7/003 |
| 10,460,534 B1* | 10/2019 | Brandmaier | G07C 5/008 |
| 2004/0258279 A1 | 12/2004 | Hirvonen et al. | |
| 2008/0189039 A1* | 8/2008 | Sadekar | G08G 1/096741 |
| | | | 701/301 |
| 2009/0002222 A1* | 1/2009 | Colburn | G01C 9/00 |
| | | | 342/145 |
| 2010/0164706 A1* | 7/2010 | Jeng | B60Q 9/007 |
| | | | 340/459 |
| 2012/0271540 A1* | 10/2012 | Miksa | B60W 30/12 |
| | | | 701/409 |
| 2013/0223686 A1* | 8/2013 | Shimizu | G08G 1/166 |
| | | | 382/103 |
| 2014/0104077 A1* | 4/2014 | Engel | G08G 1/096716 |
| | | | 340/901 |
| 2014/0379254 A1* | 12/2014 | Miksa | G01C 21/3811 |
| | | | 701/450 |
| 2015/0360611 A1* | 12/2015 | Cherkaoui | B60W 30/095 |
| | | | 340/436 |
| 2016/0003946 A1* | 1/2016 | Gilliland | G01S 17/10 |
| | | | 356/5.01 |
| 2016/0014406 A1 | 1/2016 | Takahashi et al. | |
| 2016/0203374 A1* | 7/2016 | Zeng | G06T 7/75 |
| | | | 382/104 |
| 2016/0223350 A1* | 8/2016 | Lewis | G05D 1/0278 |
| 2016/0266242 A1* | 9/2016 | Gilliland | G01S 17/931 |
| 2017/0041751 A1* | 2/2017 | Hong | G01C 21/20 |
| 2017/0043771 A1* | 2/2017 | Ibanez-Guzman | G01S 13/865 |
| 2017/0116862 A1* | 4/2017 | Inoue | G01C 21/3697 |
| 2018/0164811 A1* | 6/2018 | Yoo | G05D 1/0274 |
| 2018/0182245 A1* | 6/2018 | Takabayashi | G08G 1/133 |
| 2018/0356218 A1* | 12/2018 | Omachi | G05D 1/12 |
| 2018/0365990 A1* | 12/2018 | Suzuki | G08G 1/163 |
| 2019/0039612 A1* | 2/2019 | Yang | B60W 30/0956 |
| 2019/0114920 A1* | 4/2019 | Hilnbrand | G08G 1/162 |
| 2019/0130762 A1* | 5/2019 | Yang | G01S 5/0072 |
| 2020/0047668 A1* | 2/2020 | Ueno | B60W 50/14 |
| 2020/0079308 A1* | 3/2020 | Vanterpool | G08G 1/166 |
| 2020/0137580 A1* | 4/2020 | Yang | H04W 4/40 |

OTHER PUBLICATIONS

International Search Report dated Mar. 14, 2019 for corresponding International Application No. PCT/FR2018/053142, filed Dec. 6, 2018.

Written Opinion of the International Searching Authority dated Mar. 14, 2019 for corresponding International Application No. PCT/FR2018/053142, filed Dec. 6, 2018.

* cited by examiner

METHOD FOR MONITORING THE AREA SURROUNDING A FIRST ELEMENT LOCATED ON A CIRCULATION ROUTE, AND ASSOCIATED SYSTEM

CROSS-REFERENCE TO RELATED APPLICATIONS

This Application is a Section 371 National Stage Application of International Application No. PCT/FR2018/053142, filed Dec. 6, 2018, which is incorporated by reference in its entirety and published as WO 2019/122573 A1 on Jun. 27, 2019, not in English.

BACKGROUND OF THE INVENTION

The present invention relates to the field of autonomous vehicles and assistance for the driving of a vehicle or for the traveling of a living being, and more particularly concerns a technique for monitoring an environment of a first element positioned on a circulation route, such as a vehicle or a living being.

In a known manner, certain motor vehicles are equipped with systems used to assist the drivers of these vehicles when they are driving these vehicles, or to replace the drivers.

Such a system generally comprises a means of obtaining data concerning the environment of the vehicle (such as a camera or a radar positioned on the vehicle), and a means for analyzing the obtained data, capable of detecting an event occurring on the circulation route on the basis of data, then determining any action to be performed in response to this event.

The determination of an action to be performed by such a system is thus based solely on the data obtained by the system of the vehicle and the analysis capability of this system.

Consequently, the analysis is limited to the data obtained by the obtaining means on the vehicle. This data is however insufficient in certain driving situations, for example in the event of reduced visibility (typically in the event of poor weather conditions, or when the vehicle arrives at a raised intersection and/or an intersection at which the view is obstructed by a wall). The analysis of this data can thus lead to injudicious actions.

SUBJECT AND SUMMARY OF THE INVENTION

The present invention concerns a method for monitoring an environment of a first element positioned on a circulation route, implemented by a system comprising at least a first terminal associated with the first element, characterized in that it comprises the following steps:
  detecting a second element,
    searching for the second element detected in a list of neighboring elements positioned around the first element,
    if the list does not comprise the detected second element, recording a geolocation position of said detected second element.
The term "element" here denotes a vehicle or living being able to circulate on a circulation route, or a fixed element positioned on a circulation route, such as a radar speed gun, or a security camera.

The invention makes it possible to implement driving assistance techniques, autonomous driving techniques and techniques of assistance of the movement of a living being, based on communications between terminals, even in a transitional period during which certain elements are not equipped with terminals able to implement such techniques based on communications.

Specifically, the invention makes it possible to detect an element not equipped with such a terminal and then makes it possible to notify other elements equipped with such terminals of the presence and the position of the non-equipped element.

The other elements are thus warned of the presence of the non-equipped element at a given position and can then adapt their behavior, and are also warned of the impossibility of communicating with this non-equipped element.

The invention thus allows elements that cannot detect the presence of a non-equipped element to take into account this presence, which makes it possible to determine in a more refined manner any actions to be performed.

In a particular embodiment, the method further comprises, when the list does not comprise the second element, a step of determining an element, the so-called third element, for which the presence of the detected second element can have an impact.

In a particular embodiment, said third element is determined as a function of:
  the geolocation position,
  the direction of traveling,
  the sense of traveling,
  the trajectory, and/or
  the speed,
  of said third element and/or of said detected second element.

In a particular embodiment, the method further comprises a step of sending said geolocation position of said detected second element to a second terminal associated with the selected third element.

In a particular embodiment, the detected second element is a mobile element, the method further comprising, if the list does not comprise the detected second element:
  a step of determining at least one hypothesis of trajectory of the detected second element, and/or
  a step of determining at least one hypothesis of speed of the detected second element.

In a particular embodiment,
  the step of determining at least one trajectory hypothesis comprises the determination of a probability associated with said at least one trajectory hypothesis, and/or
  the step of determining at least one speed hypothesis comprises the determination of a probability associated with said at least one speed hypothesis.

In a particular embodiment, the method further comprises a step of determining at least one hypothesis of geolocation position of the detected second element, as a function of said at least one trajectory hypothesis of the detected second element and/or said at least one speed hypothesis of the detected second element,
  said third element being determined as a function of said at least one hypothesis of geolocation position of the detected second element.

The invention also concerns a system for monitoring an environment of a first element positioned on a circulation route, comprising at least a first terminal associated with the first element, characterized in that it comprises:
  a module for detecting a second element,
  a module for searching for the detected second element in a list of neighboring elements positioned around the first element, and a module for recording a geolocation position of said detected second element, if the list does not comprise the detected second element.

In a particular embodiment, the monitoring system further comprises a module for determining an element, the so-called third element, for which the presence of the detected second element can have an impact, if the list does not comprise the detected second element.

In a particular embodiment, the different steps of the method for monitoring according to the invention are determined by instructions of computer programs.

Consequently, another aim of the invention is a computer program, on a data medium, this program including instructions suitable for implementing the steps of a method for monitoring according to the invention.

This program can use any programming language, and be in the form of source code, object code, or intermediate code between source code and object code, such as in a partially compiled form, or in any other desirable form.

Another aim of the invention is a data medium readable by a computer and including the instructions of a computer program as mentioned above.

The data medium can be any entity or device capable of storing the program. For example, the medium can include a storage means, such as a ROM, for example a CD ROM or a microelectronic circuit ROM, or else a magnetic storage means, for example a hard disk.

Moreover, the data medium can be a transmissible medium such as an electrical or optical signal, which can be conveyed via an electrical or optical cable, by radio or by other means. The program according to the invention can be in particular be downloaded over a network of Internet type.

Alternatively, the data medium can be an integrated circuit into which the program is incorporated, the circuit being adapted to execute or to be used in the execution of the method in question.

BRIEF DESCRIPTION OF THE DRAWINGS

Other features and advantages of the present invention will become apparent from the description given below, with reference to the appended drawings which illustrate an exemplary embodiment thereof, devoid of any limiting nature. In the figures.

DETAILED DESCRIPTION OF SEVERAL EMBODIMENTS

The present invention relates to a method for monitoring an environment of a first element 110 positioned on a circulation route VC.

Figure 1A:
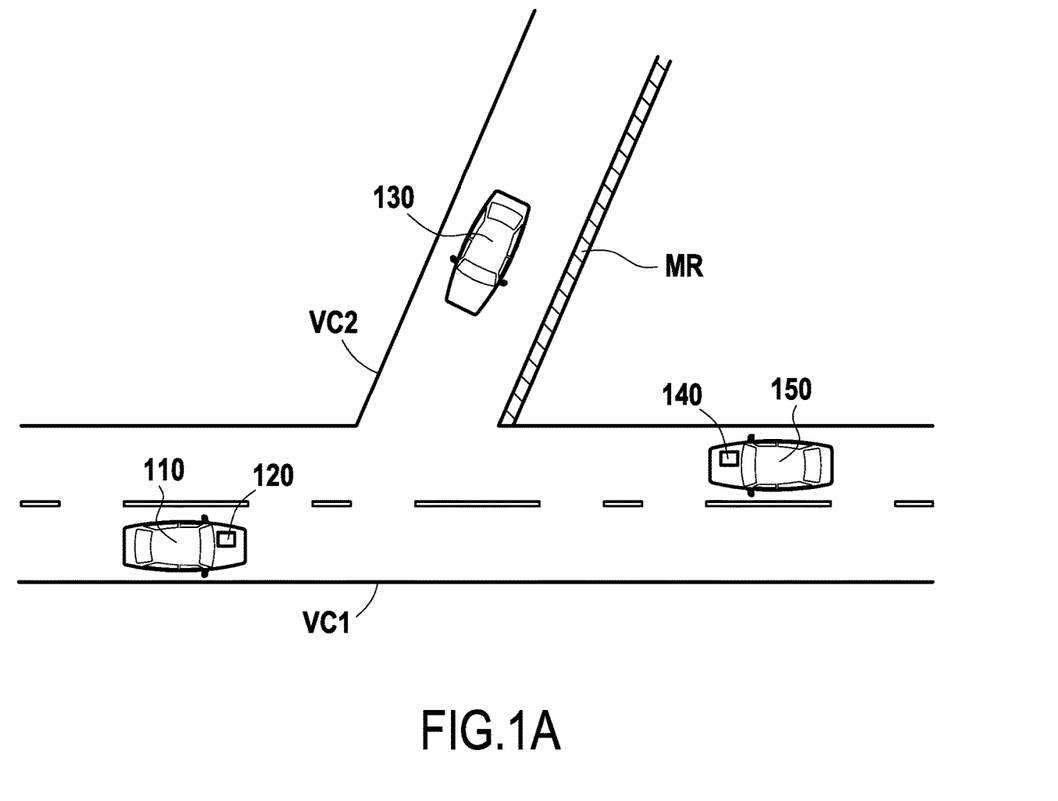
FIGS. 1A and 1B show, schematically, the first elements in their environments, able to implement a method according to an exemplary embodiment of the invention.

FIG. 1A shows, schematically, a first element 110 in its environment, able to implement a method according to an exemplary embodiment of the invention.

As can be seen in FIG. 1A, the first element 110 is in this example a first vehicle 110 circulating on a first circulation route VC1.

The first vehicle 110 is associated with a first terminal 120 able to detect a second element 130. The second element 130 is in this example a second vehicle 130, circulating on a second circulation route VC2 crossing the first circulation route VC1.

The first terminal 120 is furthermore able to send a message indicating the presence of the second vehicle 130 on the second circulation route VC2 to a second terminal 140 associated with a third element 150.

The third element 150 is in this example a third vehicle 150 circulating on the first circulation route VC1.

The sending of the message by the first terminal 120 to the second terminal 140 allows the second terminal 140 to take into account the presence of the second vehicle 130 on the second circulation route VC2 when this second vehicle 130 cannot be seen by the driver of the third vehicle 150 or be detected from this third vehicle 150, due to the presence of a wall MR positioned between the second vehicle 130 and the third vehicle 150.

Figure 1B:
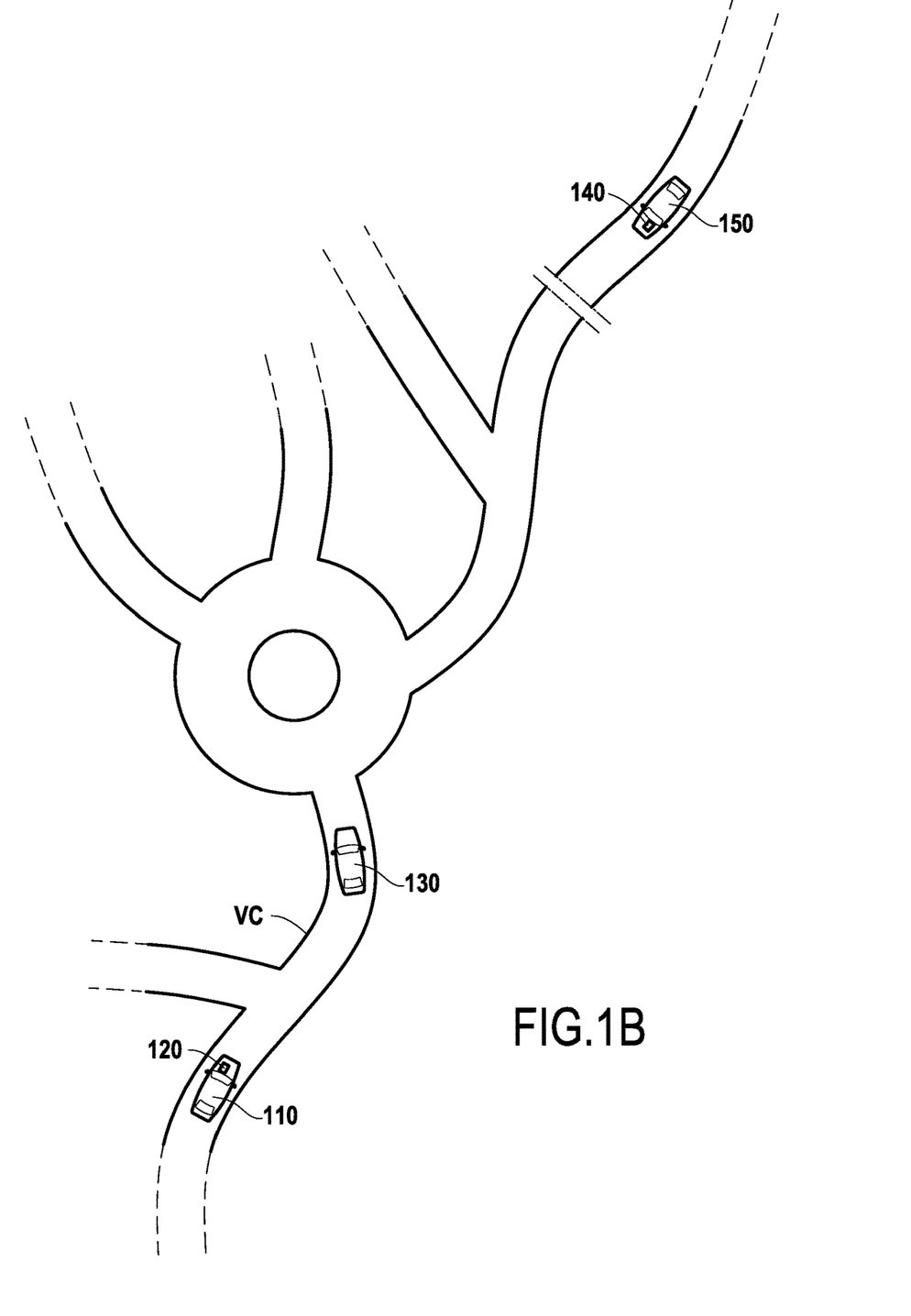

FIG. 1B shows, schematically, a first element 110 in another environment, able to implement a method according to an exemplary embodiment of the invention.

As can be seen in FIG. 1B, the first element 110 is in this example a first vehicle 110 circulating on a first circulation route VC.

The first vehicle 110 is associated with a first terminal 120 able to detect a second element 130. The second element 130 is in this example a second vehicle 130, circulating on the same first circulation route VC1, in front of the first vehicle 110 and near to the first vehicle 130.

The first terminal 120 is furthermore able to send a message indicating the presence of the second vehicle 130 to a second terminal 140 associated with a third element 150.

The third element 150 is in this example a third vehicle 150 circulating on the first circulation route VC1, several kilometers away from the first vehicle 110 and from the second vehicle 130.

The sending of the message by the first terminal 120 to the second terminal 140 allows the second terminal 140 to take into account the presence of the second vehicle 130 whereas this second vehicle 130 cannot be seen by the driver of the third vehicle 150 or be detected from this third vehicle 150, due to the great distance between the second vehicle 130 and the third vehicle 150.

Figure 2:
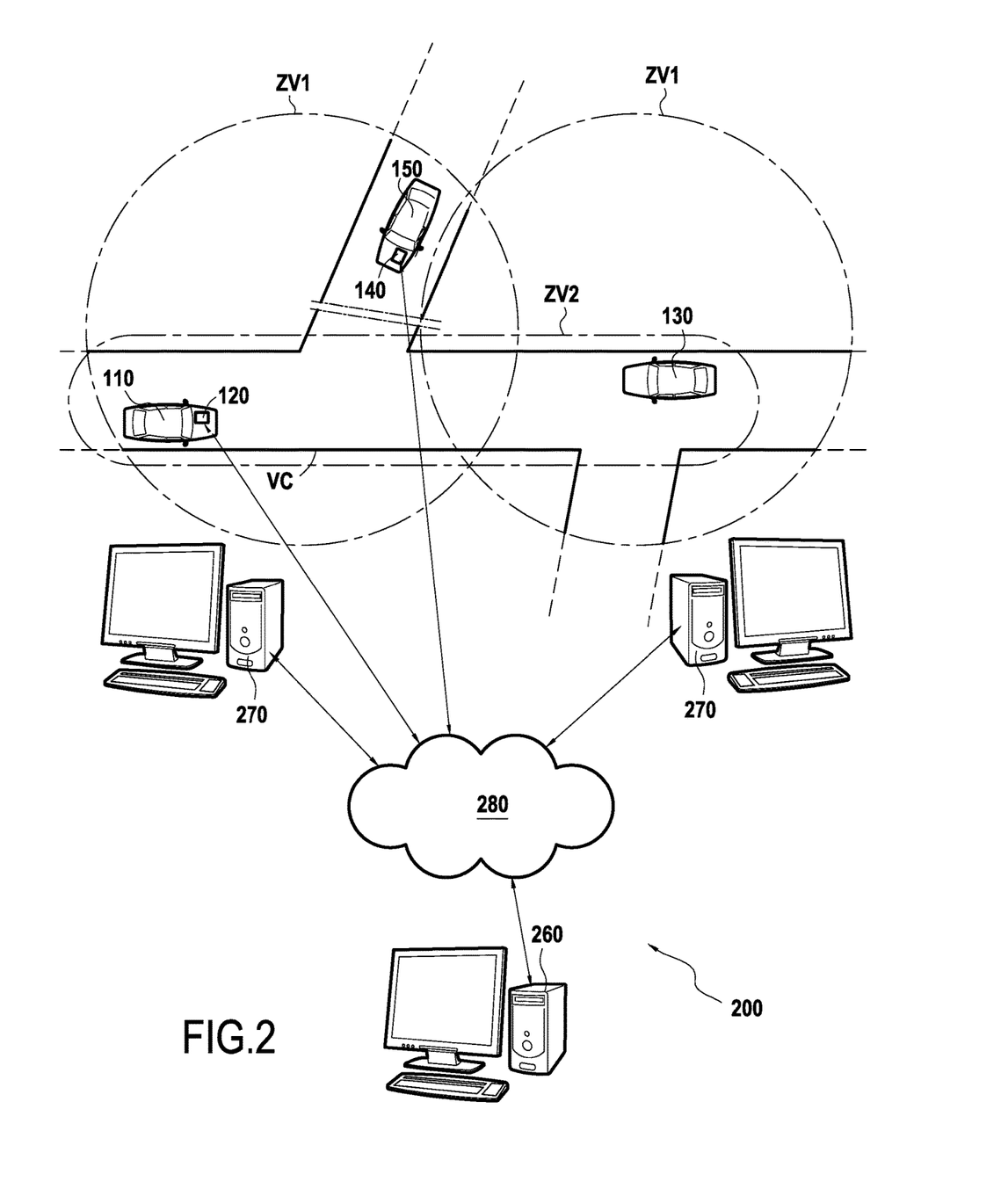
FIG. 2 shows, schematically, a system able to implement a method according to an exemplary embodiment of the invention.

FIG. 2 shows, schematically, a system 200 able to implement a method for monitoring an environment of a first element 110 according to an exemplary embodiment of the invention.

The system 200 comprises a first terminal 120, and can further comprise a main remote server 260. In addition, the system can comprise a second terminal 140.

The system 200 can also comprise several secondary remote servers 270, each secondary remote server 270 being associated with a predetermined geographical area ZV1, called "first geographical area ZV1".

Each first geographical area ZV1 corresponds in an example to a predetermined portion of circulation route VC, or to a geographical area of several kilometers in diameter, typically 20 kilometers. As can be seen in FIG. 2, two first adjacent geographical areas ZV1 can overlap.

The first terminal 120, the main remote server 260, the second terminal 140 and/or the secondary remote servers 270 can be connected to a telecommunications network 280 in order to communicate between each other. No limitation is attached to the nature of the telecommunications network 280. This may for example be an Internet network (for example WiFi), or a mobile telephone network (of 3G, 4G etc. type).

The first terminal 120 can be a mobile terminal such as a mobile phone, for example of "smartphone" type, a digital tablet, or a personal computer.

The first terminal 120 is associated with the first element 110, the first element 110 being typically a vehicle or a living being liable to circulate on the circulation route VC, or a fixed element positioned on the circulation route VC, such as a radar speed gun, or a security camera.

When the first element 110 is a vehicle, the first terminal 120 can be positioned on the vehicle 110, typically inside the vehicle 110, or incorporated (or onboard) in the vehicle 110.

In a variant, the first terminal 120 can be carried by a living being, such as a human being or an animal, typically a dog.

The second terminal 140 can also be a mobile terminal such as a mobile phone, for example of "smartphone" type, a digital tablet, or a personal computer.

Furthermore, the second terminal 140 is associated with an element 150, the so-called "third element 150", this third element 150 being typically a mobile element such as a vehicle or a living being able to circulate on the circulation route VC or another circulation route. In a variant, the third element 150 is a fixed element positioned on the circulation route VC, such as a radar speed gun, or a security camera.

When the third element 150 is a vehicle, the second terminal 140 can be thus positioned on the vehicle 150, typically inside the vehicle 150, or incorporated into the vehicle 150.

In a variant, the second terminal 140 can be carried by a living being, such as a human being or an animal, typically a dog.

The first element 110 and/or the third element 150 can be an autonomous vehicle, and can take the form of a motorized vehicle such as a motor vehicle, a truck, a bus or a two-wheeler, a bicycle, a train, a tram or else a boat.

The system 200 can further include one or more other terminals, each terminal being associated with a mobile element such as a vehicle or a living being liable to circulate on a circulation route, or a fixed element, such as a display panel positioned on a circulation route.

In addition, the system 200 can include one or more other remote servers, for example dedicated to long-term storage.

FIG. 2 further shows another element, the so-called "second element 130", which can be a mobile element such as a vehicle or a living being which can circulate on a circulation route, or a fixed element, such as an obstacle positioned on a circulation route (typically a stone or a tree fallen on a circulation route).

For example, the first element 110, the first terminal 120, the second element 130, the third element 150 and the second terminal 140 correspond respectively to the first vehicle 110, the first terminal 120, the second vehicle 130, the third vehicle 150 and the second terminal 140 of FIG. 1A or of FIG. 1B.

Figure 3:
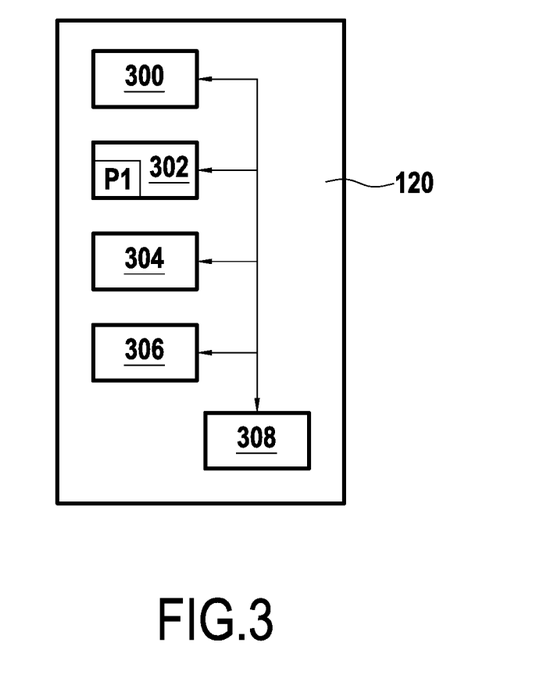
FIG. 3 shows, schematically, a first terminal of the system of FIG. 2.

As shown in FIG. 3, the first terminal 120 has the conventional architecture of a computer. The first terminal 120 particularly includes a processor 300, a read-only memory 302 (of ROM type), a rewritable non-volatile memory 304 (of EEPROM or NAND Flash type for example), a rewritable volatile memory 306 (of RAM type), and a communication interface 308.

The read-only memory 302 of the first terminal 120 constitutes a recording medium in accordance with an exemplary embodiment of the invention, readable by the processor 300 and on which is stored a computer program P1 in accordance with an exemplary embodiment of the invention. In a variant, the computer program P1 is stored in the rewritable non-volatile memory 304.

The computer program P1 can allow the first terminal 120 to implement the method for monitoring in accordance with an exemplary embodiment of the invention, or at least a part of this method.

This computer program P1 can thus define functional and software modules, configured to implement the steps of a method for monitoring in accordance with an exemplary embodiment of the invention, or at least a part of these steps. These functional modules rely on or control the hardware components 300, 302, 304, 306 and 308 of the first terminal 120 mentioned previously. They can notably comprise here a detection module, a search module, a recording module and/or a determination module.

Furthermore, the first terminal 120 can comprise an onboard camera, a radar, a laser scanner and/or a means of GPS or Galileo guidance.

In a variant, the first element 110 can comprise an onboard camera, a radar and/or a means of GPS or Galileo guidance, which the first terminal 120 can access.

When the first element 110 is a vehicle, the onboard camera is then positioned on the windshield and/or the rear window of the vehicle.

The main remote server 260, the second terminal 140 and/or each secondary remote server 270 can also have the conventional architecture of a computer, and can then each notably include a processor, a read-only memory (of ROM type), a rewritable non-volatile memory (of EEPROM or NAND Flash type for example), a rewritable volatile memory (of RAM type) and a communication interface.

Each read-only memory can constitute a recording medium in accordance with an exemplary embodiment of the invention, readable by the associated processor and on which is recorded a computer program in accordance with an exemplary embodiment of the invention. In a variant, the computer program is stored in the associated rewritable non-volatile memory. The computer program can allow the implementation of at least a part of the method for monitoring in accordance with an exemplary embodiment of the invention. The computer program can thus define functional and software modules, configured to implement at least a part of the steps of a method for monitoring in accordance with an exemplary embodiment of the invention. These functional modules rely on or control the hardware components mentioned previously.

Figure 4:
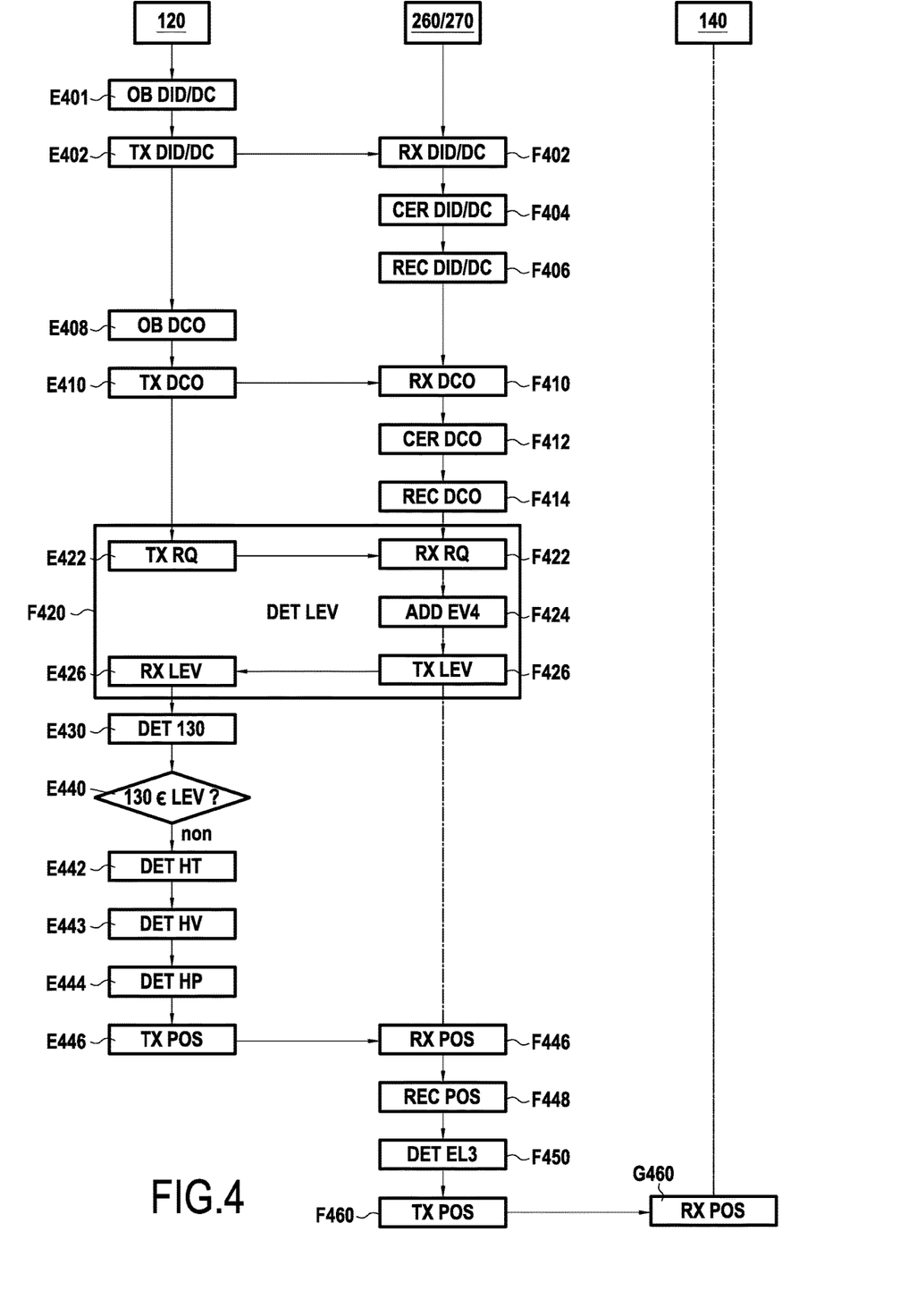
FIG. 4 shows, in the form of a flow chart, the main steps of a method according to an exemplary embodiment of the invention.

FIG. 4 shows a method for monitoring an environment of a first element positioned on a circulation route, according to an exemplary embodiment of the invention.

The method is implemented by a system such as the system 200 of FIG. 2.

In a step E401, the first terminal 120 obtains an item of identification data DID or characterization data DC of the first element 110.

The item of identification data that can be obtained is typically the MSISDN (Mobile Station Integrated Services Digital Network) number of the first terminal 120 associated with the first element 110.

In a variant, the item of identification data that can be obtained is a number of a registration plate of the first element 110.

Furthermore, the item of characterization data that can be obtained can indicate the general category to which the first element 110 belongs, i.e. indicate if the first element 110 is fixed or mobile, or more precisely if the first element 110 is a motor vehicle, a truck, a bus, a two-wheeler, a bicycle, a train, a tram, a boat, a human being, an animal, or a display panel.

In a variant, the item of characterization data that can be obtained can indicate a sub-category of the general category to which the first element 110 belongs. For example, if the first element 110 is a vehicle, this item of data concerns the type of vehicle, the brand of the vehicle, the model of the vehicle, or the color of the vehicle.

In a variant, the item of characterization data can indicate the capability of analysis of the first element 110, i.e. the capability of the element to implement the steps E408, E410, E422, E426, E430, E440, E442, E443, E444, and/or E446 described hereinafter.

In a variant, when the first element 110 is mobile, the item of characterization data that can be obtained indicates the weight of the first mobile element 110, the maximum speed of the first mobile element 110, or again the right of way of the first mobile element 110, typically in a country and/or with respect to a given event.

The "right of way" indicates if the mobile element 110 has right of way on the circulation routes. The right of way can depend on the country in which the mobile element 110 circulates. An example concerns public service vehicles with right of way, typically ambulances, which have right of way in France during their interventions.

In a variant, when the first element 110 is fixed, the item of characterization data that can be obtained indicates the geolocation position of the first fixed element 110.

In a step E402, the first terminal 120 sends to the main remote server 260, via the telecommunications network 280, the item of identification data DID or characterization data DC obtained in step E401.

In an example, the first terminal 120 implements the step E402 when the first terminal 120 is registered with an application implementing the method or when the first element 110 is registered.

In another example, the first terminal 120 implements the step E402 when the first terminal 120 is equipped with the first element 110, or at the beginning of a journey on the circulation route VC.

The first terminal 120 can then keep all or part of the data, and send it to the main remote server 260 after being authenticated by the main remote server 260, which makes it possible to preserve the anonymity of the data when the method is not implemented. In a variant, in order to avoid an excessively high volume of data transfer, the first terminal 120 can send a link to a storage space of another remote server, typically after authentication of the first terminal 120 by the main remote server 260 and where applicable by the other remote server.

Step E401 and where applicable step E402 can be repeated one or more times by the first terminal 120 in order to obtain and send one or more additional items of identification data DID and/or characterization data DC of the first element 110 (several items of data can be sent at the same time in step E402).

Steps E401 and E402 can also be repeated in order to update one or more items of data.

Specifically, certain items of data such as the weight of the first element 110 or the right of way of the first element 110 can vary over time.

For example, the weight of a vehicle varies as a function of the loading of this vehicle. Furthermore, a vehicle can have right of way during an intervention and not have right of way outside these interventions.

Steps E401 and E402 can furthermore be implemented one or more times by one or more terminals associated with elements other than the first element 110. The items of data obtained then relate to the element associated with the terminal implementing these steps.

Steps E401 and E402 can thus be implemented one or more times by the second terminal 140 associated with the third element 150.

After receiving an item of data (step F402), the main remote server 260 records the item of data in order to store it (step F406), typically in a secure manner, where applicable after certifying it (step F404).

The item of data received in this step F402 can be stable, i.e. not vary over time. The storage time of the item of data can thus be considerable.

The items of identification data DID or characterization data DC concerning one and the same element are stored associated together by the main remote server 260. In an example, each item of data sent in step E402 by one and the same terminal associated with an element is accompanied by one and the same item of identification data, the item of identification data allowing the main remote server 260 to make the link between the items of data concerning one and the same element.

In a step E408, the first terminal 120 obtains an item of context-related data DCO of the first element 110.

The item of context-related data DCO obtained can be a geolocation position of the first element 110.

In a variant, the item of context-related data DCO can be the number of users of the first element 110.

In a variant, when the first element 110 is mobile, the item of context-related data DCO can be:
  a direction of circulation of the first element 110,
  a sense of circulation of the first element 110,
  a provisional trajectory of the first element 110,
  a provisional journey of the first element 110, the journey comprising a series of provisional trajectories,
  the position of the first element 110 in said journey,
  the speed of the first element 110,
  a change in speed of the first element 110,
  a position of the first element with respect to another element.

The first terminal 120 can obtain the geolocation position, the trajectory, the journey, the direction, the sense of circulation and/or the position of the element in the journey by accessing the GPS or Galileo guidance means of the first terminal 120 or of the first element 110.

Furthermore, the first terminal 120 can obtain the speed and/or the change of speed as a function of the successive GPS coordinates of the first mobile element 110, obtained by accessing the GPS or Galileo guidance means of the first terminal 120 or of the first mobile element 110. The first terminal 120 can also obtain the speed and/or the change in speed by accessing the speed data of the speedometer of the first mobile element 110.

In a step E410, the first terminal 120 sends to the main remote server 260, via the telecommunications network 280, the item of context-related data DCO, along with an item of identification data DID of the first element 110.

The sending can be performed in real time, after obtaining the item of context-related data DCO performed in step E408.

After receiving the item of context-related data DCO (step F410), the main remote server 260 records the item of context-related data DCO in order to store it (step F414), typically in a secure manner, where applicable after certifying it (step F412).

More precisely, the item of context-related data DCO is stored in association with the item or items of identification data DID and/or characterization data DC concerning the first element 110. The item of identification data DID of the first element 110 sent in the step E410 allows the main remote server 260 to make the link between the item of context-related data DCO received and the item or items of identification data DID and/or characterization data concerning the first element 110, previously recorded by the main remote server 260.

In a variant, the item of context-related data DCO and the item of identification data DID of the first element 110 are sent to the secondary remote server 270 corresponding to the first geographical area ZV1 in which the first element 110 is positioned.

The secondary remote server 270 then stores the item of context-related data DCO in association with the item of identification data DID (step F414), typically in a secure manner, where applicable after certifying the item of context-related data DCO (step F412).

The secondary remote server 270 can then consult the main remote server 260 by sending the item of identification data DID in order to retrieve, then store in association with the item of context-related data DCO, one or more items of identification data DID and/or characterization data DC concerning the first element 110.

The storage time of the data can be limited, typically to a few minutes after the first element 110 has left the first geographical area ZV1. Thus, the secondary remote server 270 associated with the first geographical area ZV1 in which the first element 110 is positioned can store, at a given instant, the geolocation position of the first element 110 at the given instant, one or more geolocation positions of the first element 110 at one or more instants preceding the given instant, and provisional trajectories at one or more instants following the given instant.

In a variant, the time of storage of the item of data can be longer than a few minutes, such that the secondary remote server 270 can supply this item of data for legal requirements (in order, for example, to determine liability in the event of an accident), or else so that the secondary remote server 270 can supply a journey history, for example to the main remote server 260, so that the main remote server 260 can determine an item of behavioral data of the element, or items of provisional traffic data.

The item of context-related data DCO can also be sent to a remote server dedicated to long-term storage, so that this item of data can be used for the abovementioned purposes.

When the first element 110 is located in an area of overlap of two first adjacent areas ZV1, the first terminal 120 can send the item of context-related data DCO to the two secondary remote servers 270 corresponding to the two first adjacent areas ZV1.

The sharing of the first geographical areas ZV1 between several secondary remote servers 270 makes it possible to reduce the data processing time at each server.

When the provisional journey of the first element 110 is known, the secondary remote server 270 corresponding to the first geographic area ZV1 in which the first element 110 is positioned can send the data received in step F410 to the secondary remote server 270 corresponding to the next first geographic area ZV1 through which the provisional journey passes, such as to limit the interrogation time of this last secondary remote server 270 during the passage from one first area to another.

Step E408 and where applicable step E410 can be repeated one or more times by the first terminal 120 in order to obtain and send one or more additional items of context-related data DCO of the first element 110 (several items of context-related data DCO can be sent at the same time in step E410).

Steps E408 and E410 can furthermore be implemented one or more times by one or more terminals associated with elements other than the first element 110. The items of data obtained then relate to the element associated with the terminal implementing these steps.

Steps E408 and E410 can thus be implemented one or more times by the second terminal 140 associated with the third element 150.

The repetition of steps E408 and E410 can be performed when the provisional trajectory, the provisional journey, the speed, and/or the change of speed are modified.

The repetition of steps E408 and E410 can be periodic. The repetition period can be in the order of the second, which allows an updating in almost real time of the context-related data concerning the first element 110.

The period of repetition can be longer so as not to saturate the telecommunications network 280, for example when the first element 110 is making a provisional journey at a steady speed.

The repetition period can furthermore be adapted as a function of the observed density of traffic, the speed of the first element 110, or the trajectory of the first element 110.

In a step F420, a first list LEV of neighboring elements positioned around the first element 110, typically at a first instant corresponding to the implementation of this step F420, is determined.

At the end of this step F420, the first list LEV of neighboring elements can be empty, or comprise one or more neighboring elements.

An element (the so-called "fourth element EV4") is added to said first list LEV if a geolocation position of said fourth element EV4 (typically the geolocation position of the fourth element EV4 at the first instant) is located in a second geographical area ZV2 predefined around the geolocation position of the first element 110 (to be distinguished from the first geographical areas ZV1).

More precisely, the first list LEV is determined on the basis of one or more geolocation positions of elements received during implementations of step F410.

In an example, the first terminal 120 sends, in a sub-step E422 and via the telecommunications network 280, a request RQ to the main remote server 260, so that the latter determines if one or more stored geolocation positions are located in the second geographical area ZV2 predefined around the geolocation position of the first element 110.

The request RQ may comprise an item of identification data DID of the first element 110 and where applicable the geolocation position of the first element 110. In a variant, the geolocation position is retrieved by the main remote server 260 starting from the item of identification data DID of the first element 110.

The request RQ can further comprise an area criterion making it possible to define the second geographical area ZV2 around the geolocation position of the first element 110. The criterion is for example a radius or a perimeter of the area.

The main remote server 260 can then add to the first list LEV each fourth element EV4 corresponding to a geolocation position located in the second geographical area ZV2 (sub-step F424). The first list LEV can then comprise each geolocation position located in the second geographical area ZV2, each position being associated with the corresponding item of identification data.

Each geolocation position located in the second geographical area ZV2 can furthermore be associated in the first list LEV with one or more corresponding items of characterization data.

The main remote server 260 then sends, in a step F426 and via the telecommunications network 280, the first list LEV to the first terminal 120.

In a variant, and if the first list LEV is empty, the step F426 is not implemented.

In a variant, the first terminal 120 can refrain from sending any request. The main remote server 260 can then send the first list LEV to the first terminal 120 periodically, or send the first list LEV when this first list is modified, i.e. when a fourth element EV4 is added or removed from the first list LEV, or when a geolocation position is modified.

In a variant, when the first terminal 110 sends, in step E410, the item of context-related data DCO to the secondary remote server 270 associated with the first area ZV1 in which the first terminal 110 is located (hereinafter called "concerned secondary remote server 170"), the first terminal 110 can send, in sub-step E422, the request RQ to the concerned secondary remote server 270. The sub-steps F422, F424 and F426 are then implemented by the concerned secondary remote server 270. The sub-steps F424 and F426 can also be implemented by the concerned secondary remote server 270, if no request RQ is received.

In a step E430, the module for detecting of the first terminal 120 detects the second element 130. This step E430 can be implemented before or after the step F420 of determining the first list LEV, or else simultaneously.

The second element 130 is positioned near the first element 110 during the implementation of this step E430.

The expression "positioned near" means that the distance between the second element 130 and the first element 110 allows the first terminal 120 to detect the second element 130. This distance can thus depend on the type of sensor used (camera, radar, laser scanner etc.)

The second element 130 is for example positioned on the same circulation route VC as the first element 110, typically in front of or behind the first element 110, and can circulate in a sense of circulation and/or a direction different from the sense of circulation and/or the direction of the first element 110. The second element 130 can furthermore be positioned on another circulation route located near the circulation route VC of the first element 110, for example crossing the circulation route VC of the first element 110 at an intersection.

A geolocation position of the second element 130 and where applicable an item of identification data DID of the second element 130 (typically the registration plate number) can be obtained during the implementation of step E430.

Furthermore, one or more items of characterization data DC (typically the general category, and a sub-category of the general category) and/or context-related data (typically the direction of traveling, the sense of circulation, the speed, the change in speed, the number of users etc.) of the second element 130 can be obtained during the implementation of step E430.

Furthermore, a position of the second element 130 with respect to another element (typically the first element 110) can be obtained.

The second element 130 can be detected by analyzing an image obtained by the onboard camera of the first terminal 120 or of the first element 110 (or several images). This image analysis can furthermore make it possible to identify the second element 130 and/or determine the distance between the first element 110 and the second element 130.

Thus, an item of identification data and/or a geolocation position of the second element 130 can be obtained.

The number of users of the second element 130 can also be determined by means of this image analysis.

In an example, the second element 130 can be identified by comparing the image of the second element 130 transmitted by the camera with image templates of predetermined elements in order to determine the type of element (brand, color, model, size etc.)

The second element 130 can furthermore be identified by extracting its registration number from the image obtained.

Furthermore, the distance between the first element 110 and the second element 130 can be determined by comparing the image of the second element 130 with a reference image, this reference image typically representing an element of the same type as the second element 130.

The proportions of the second element 130 on the obtained image can in particular be compared with the proportions of the element of the reference image, in order to determine the distance. The conditions of capture of the transmitted image and the reference image can be considered.

In another example which can be combined with the previous example, the first terminal 120 detects the second element 130 by analyzing an electromagnetic signal sent by means of the radar of the first terminal 120 or the first element 110, reflected by the second element 130, then received by the radar.

More precisely, the second element 130 can be identified by determining the signature echo of said second element 130 in the received signal. The distance between the first element 110 and the second element 130 can also be obtained, typically on the basis of the time elapsed between the sending of the signal and the reception of the reflected signal.

In another example that can be combined with the preceding examples, the first terminal 120 detects the second element 130 by analyzing a laser signal sent by means of the laser scanner of the first terminal or the first element 110, reflected by the second element 130, then received by the scanner.

One or more items of characterization data of the second element 130 (for example the vehicle type) can be obtained by analyzing the received signal, typically using charts. The distance between the first element 110 and the second element 130 can also be obtained, typically on the basis of the time elapsed between the sending of the signal and the reception of the reflected signal.

Next, in a step E440, the searching module of the first terminal 120 searches for the second element 130 detected in step E430 in the first list LEV determined in step F420.

More precisely, the geolocation position obtained in step E430 can be compared with one or more geolocation positions of the first list LEV obtained in step F420.

Furthermore, the item of identification data obtained in step E430 can be compared with one or more items of identification data of the first list LEV.

If in the first list LEV the geolocation position obtained in step E430 corresponds to a geolocation position of this first list LEV, and/or if the item of identification data obtained in step E430 corresponds to an item of identification data of this first list LEV, this first list LEV comprises the detected second element 130. It is then determined that the second element 130 is equipped with a terminal able to implement the steps E401, E402, E408 and E410, and that it is consequently able to communicate, at least with the main remote server 260 and/or the secondary remote server 270, and along with the position of this second element 130 can be known by consulting this server 260, 270.

In the contrary case, i.e. in the case where no correspondence can be retrieved from the first list LEV determined in step F420, this first list LEV does not comprise the detected second element 130. It is then determined that the second element 130 is not equipped with a terminal able to implement the steps E401, E402, E408 and E410, and that it is thus certainly not able to communicate with the first terminal 120.

If the item of identification data obtained in step E430 corresponds to an item of identification data of the first list LEV, but the geolocation position obtained in step E430 does not correspond to a geolocation position of this first list LEV, the first terminal 120 can send the geolocation position obtained in step E430 along with the item of identification data to the main remote server 260 or to the secondary remote server 270, such that the latter can update the geolocation position of the second element 130.

Steps E430 and E440 can be repeated by the first terminal 120 in order to detect then search for another second element positioned near the first element 110. All the second elements positioned near the first element 110 and able to be detected can thus be searched for in the first list LEV.

If, once all the second elements have been searched for, an element of the first list LEV does not correspond to one of the searched-for second elements, an alert message can be sent to this element in order for it to send its geolocation position to the main remote server 260 or to the secondary remote server 270, for the purpose of updating this position.

If the first list LEV determined in step F420 does not comprise the detected second element, the geolocation position of the detected second element 130 is recorded by a recording module of the first terminal 120, of the main remote server 260 or of the concerned secondary remote server 270.

In addition, when the first list LEV does not comprise the detected second element 130, the first terminal 120 can determine at least one hypothesis of trajectory HT of the second element 130, where applicable associated with a predetermined time period (step E442). The first terminal 120 typically determines this trajectory hypothesis HT on the basis of a map of circulation routes and on the basis of items of context-related data of the second element 130, obtained during the implementation of step E430.

A probability can be associated with each determined trajectory hypothesis HT, this probability depending for example on the position of the second element 130 on the map, on the speed of the second element 130 and where applicable on the registration plate number of the second element 130. Furthermore, the probability can depend on one or more elements around the second element 130, typically a mobile element circulating near the second element 130. For example, if a vehicle circulates in front of the second element 130, in the same sense of circulation as the second element 130 but at a lower speed, the probability associated with a change of trajectory is high.

The probability associated with the trajectory hypothesis HT can also increase by the detection by the first terminal 120 of a signal given by the second element 130, such as a light signal of a flashing traffic light.

Furthermore, the first terminal 120 can determine at least one hypothesis of speed HV (or of change of speed) of the second element 130, where applicable associated with a predetermined time period and with a trajectory hypothesis corresponding to this time period (step E443).

In an example, two speed hypotheses HV can be determined for one and the same time period. For example, it can be determined that the second element 130 could overtake another element on its circulation route (and therefore that the second element 130 should accelerate) or that the second element 130 could stay behind this other element (and therefore that the second element 130 should stay at the same speed).

Here again, a probability can be associated with each determined speed hypothesis HV. This probability depends for example on the position of the second element 130 on the map, on the speed of the second element 130, on the presence of other elements etc. Thus, in the preceding example, the probability that the second element 130 is accelerating is greater when no vehicle ahead of the second element 130 is coming towards it and/or no vehicle is coming up behind it.

In an example, the second element 130 is a vehicle circulating on the circulation route VC of the first element 110, and the map indicates that this circulation route VC crosses another circulation route, smaller than the circulation route VC.

A first trajectory hypothesis then determined can correspond to the circulation of the vehicle 130 on the circulation route VC up to an intersection, during a first time period determined as a function of the speed of the vehicle 130.

In addition, a second trajectory hypothesis, associated with a second time period following the first determined time period, can correspond to the circulation of the vehicle 130 on the circulation route VC after the intersection. Furthermore, a third trajectory hypothesis, associated with the second time period, can correspond to the circulation of the vehicle 130 on the other circulation route after the intersection.

The probabilities associated with the second and third hypotheses are complementary. The nearer the intersection and the greater the speed of the vehicle 130, the higher the probability associated with the second hypothesis and the lower the probability associated with the third hypothesis. Furthermore, the probability associated with the third hypothesis can be increased if the registration plate number of the vehicle 130 indicates that this vehicle 130 is registered in the region of the intersection or again if the intersection is located in a tourist area.

In addition, in this same example, one or more speed hypotheses can be determined. For example, a first speed hypothesis, associated with the second time period and with the second trajectory hypothesis, is that the second element 130 is accelerating, while a second speed hypothesis, associated with the same second time period and with the second trajectory hypothesis, is that the second element 130 is slowing down. Here again, the probabilities associated with the first and second speed hypotheses are complementary.

In a step E444, the first terminal 110 can determine one or more hypotheses of geolocation position HP of the second element 130 at one or more predetermined instants.

Each predetermined instant typically corresponds to the end of a predetermined time period and the geolocation position hypothesis or hypotheses HP are then determined on the basis of each trajectory hypothesis HT associated with this predetermined time period and/or each speed hypothesis HV associated with this predetermined time period. The probabilities associated with each hypothesis HT, HV can also be taken into account for the determination of the geolocation position hypothesis or hypotheses HP.

The first terminal 120 can send, in a step E446, the geolocation position POS of the second element 130 to the main remote server 260, typically with the item of identification data DID of the second element 130 determined in step E430 and where applicable at least one item of characterization data DC and/or an item of context-related data DCO of the second element 130, determined in step E430.

Furthermore, each hypothesis of geolocation position HP determined in step E444, along with any associated probability, can be sent by the first terminal 120 to the main remote server 260 in this step E446.

The main remote server 260 then records, in a step F448, the received item or items of data, in order to store them, typically in a secure manner, after certifying them where applicable. The items of data are then accessible to each terminal consulting the main remote server 260.

In a variant, in step E446, the first terminal 120 sends the item or items of data to the concerned secondary remote server 270. The concerned secondary remote server 270 then implements step F448.

In a variant, in this step E446, each trajectory hypothesis determined in step E442, along with any associated probability, and/or each speed hypothesis determined in step E443, along with any associated probability, can be sent by the first terminal 120 instead of the geolocation position hypothesis or hypotheses HP. The main remote server 260 or the concerned secondary remote server 270 then implements step E444.

In a variant, step E440 is implemented by the main remote server 260 or the concerned secondary remote server 270. The server 260 or 270 can then refrain from implementing the sub-step F426. The first terminal 120 then sends the geolocation position and where applicable the item of identification data obtained in step E430 to the main remote server 260 or the secondary remote server 270. Step E446 is then not implemented.

In a step F450, the main remote server 260 can determine one or more elements EL3 which, at a predetermined instant (or during a predetermined time period, having for starting point said predetermined instant), is positioned near the second element 130 (for example the third element 150 of FIG. 2).

Each element EL3 determined during the implementation of this step F450 is determined as a function of at least one item of context-related data DCO of said element EL3 recorded in step F414, and at least one item of data concerning the second element 130, recorded in step F448.

More precisely, for a predetermined instant, each element EL3 determined in this step is determined as a function of:
  the geolocation position,
  the direction of circulation,
  the sense of circulation,
  the trajectory, and/or
  the speed,
of said element EL3 and/or of the second element 130 during this predetermined instant.

The main remote server 260 can determine a second list, of elements EL3 positioned around the second element 130, typically at a second instant, typically corresponding to the implementation of step F450. The second list can be empty or comprise one or more elements EL3.

In order to determine this second list, the main remote server 260 uses the geolocation position of the second element 130, obtained in step E430, in order to define a third geographical area around this geolocation position.

In a variant, the third geographical area is defined around each position hypothesis HP determined in step E444 for the second instant.

In a variant, the third geographical area is defined around the position hypothesis HP determined for the second instant and being associated with the highest probability.

Next, an element EL3 is added to said second list if the geolocation position of said element EL3 at said second instant is located in the third geographical area.

The main remote server 260 can specifically compute, on the basis of stored items of context-related data DCO, a provisional geolocation position of an element EL3 at the second instant, then can add the element EL3 to the second list if it determines that this position is located in the third geographical area.

Thus, the position, the provisional trajectory and/or the speed of each element EL3, along with the position hypothesis or hypotheses of the second element 130 can be taken into account by the main remote server 260.

One or more other second lists can be determined, each list corresponding to a different second instant. Several successive instants, typically separated by a few tens of seconds, can be considered.

The time period between two successive instants can depend on a speed difference between said element EL3 and a second element 130. Thus, the lower the speed difference, the longer the time period can be.

The time period is typically less than or equal to one minute, and can be equal to 10 seconds, 20 seconds, 50 seconds etc.

If the speed difference between said element EL3 and the second element 130 is great and these elements are close together, said element EL3 can then be added to a second list corresponding to a second instant and not be added to another second list, corresponding to another second instant following said second instant.

If, on the contrary, the speed difference is small the element EL3 can be added to the two second lists (for example when the second element 130 is circulating in front of or behind said element EL3, in the same direction and in the same sense of circulation).

The implementation of step F450 makes it possible to determine one or more elements EL3 for which the presence of the second element 130 can have an impact. The impact can typically be a collision between the element EL3 and the second element 130, or the modification of a driving parameter of the element EL3 (such as the trajectory or the speed). The impact can furthermore be the need to send a message to another element.

Thus, an element EL3, the trajectory of which is at risk of meeting or crossing the trajectory of the second element 130 during the predefined time period can be determined in step F450.

In a step F460, the main remote server 260 can send the geolocation position of the second element 130 to each terminal associated with an element EL3 determined during an implementation of step F450, via the telecommunications network 280.

Furthermore, each trajectory hypothesis HT of the second element 130 determined during an implementation of step E442, each speed hypothesis HV of the second element 130 determined during an implementation of step E443, and/or each position hypothesis HP of the second element 130 determined during an implementation of step E444 can be sent.

The item or items of data are for example sent using the MSISDN number of each destination terminal, this number having been recorded in step F406.

When one or more second lists are determined in step F450, the main remote server 260 sends, to each element EL3 of each second list, the geolocation position or the position hypothesis HP of the second element 130, corresponding to the instant associated with the list comprising said element EL3.

In addition, in this step F460, at least one other item of data obtained in step E430 can be sent to each terminal associated with a selected element EL3. Thus, each terminal can also receive an item of identification data DID of the second element 130 (typically the registration plate number), one or more items of characterization data DC (typically the general category, sub-category of the general category) and/or one or more items of context-related data (typically the direction of circulation, the sense of circulation, the speed, the change in speed, or the number of users) of the second element 130.

The item or items of data are, for example, sent in a SIP-option message, according to a RCS protocol.

The item or items of data are received by a terminal associated with an element EL3 selected in a step G460.

It is considered that an element determined in this step F450 is the third element 150. The geolocation position of the second element 130, and where applicable at least one other item of data obtained in step F460 are then sent to the second terminal 140.

Thus, an element such as the third element 150 is warned of the presence of the second element 130 at a given position and can adapt its behavior in consequence, even if the second element 130 cannot be seen by the driver of the third element 150 or be detected from this third element 150.

In a variant, the steps F450 and/or F460 are implemented by the first terminal 110 or the concerned secondary remote server 270.

The steps E422, E442, E443, E444, E446, F446, F448, F450, F460 and/or G460 can be repeated for each other second element detected and not included in the first list LEV.

Furthermore, steps E422, E426, E430, E440, E442, E443, E444 and/or E446 can be repeated by another terminal than the first terminal 120. This repetition by another terminal notably makes it possible to confirm the hypotheses of trajectory HT and speed HV of the second element 130 and to update the geolocation position of the second element 130.

During this repetition, the first element 110 can be excluded from the elements warned in step F460 of the presence of the second element 130, the first terminal 120 having already detected this second element 130.

During the repetition of step F446, the main 260 or concerned secondary 270 remote server can furthermore send a third list of elements previously detected during an implementation of step E430 and not retrieved in a first list LEV during the implementation of step E440, the third list of previously detected elements typically comprising the data obtained during the implementation of step E430 and the hypotheses determined during the implementation of steps E442, E443 and/or E444. The sending of this third list makes it possible to facilitate and/or confirm the identification of the element detected during the repetition of step E430.

The invention claimed is:

1. A method for monitoring an environment of a first element positioned on a circulation route, implemented by a system comprising at least a first terminal associated with the first element, wherein the method comprises:
   detecting a second element, searching for the detected second element in a list of neighboring elements positioned around the first element, the neighboring elements of the list being equipped with a terminal configured to implement said method, in response to the list not comprising the detected second element, indicating that the second element is not equipped with a terminal configured to implement said method for an environment of the second element:
   recording a geolocation position of said detected second element, and
   determining a third element, for which presence of the detected second element can have an impact.

2. The method according to claim 1, wherein said third element is determined as a function of:
   the geolocation position, and/or
   a direction of circulation, and/or
   a sense of circulation, and/or
   a trajectory, and/or
   a speed,
of said third element and/or of said detected second element.

3. The method according to claim 1, further comprising sending said geolocation position of said detected second element to a second terminal associated with the selected third element.

4. The method according to claim 1, wherein the detected second element is a mobile element,
said method further comprising, in response to the list not comprising the detected second element:
   determining at least one hypothesis of trajectory of the detected second element, and/or
   determining at least one hypothesis of speed of the detected second element.

5. The method according to claim 4, wherein:
   the determining at least one trajectory hypothesis comprises determination of a probability associated with said at least one trajectory hypothesis, and/or
   the determining at least one speed hypothesis comprises determination of a probability associated with said at least one speed hypothesis.

6. The method according to claim 4, further comprising determining at least one hypothesis of geolocation position of the detected second element, as a function of said at least one trajectory hypothesis of the detected second element and/or said at least one speed hypothesis of the detected second element,
said third element being determined as a function of said at least one hypothesis of geolocation position of the detected second element.

7. The method according to claim 1, further comprising:
   transmitting, by the first element, an item of context-related data to a first remote server handling a first area in which the first element is located,
   determining, by the first remote server, a second remote server handling a provisional area in which the first element could be located in the future, and
   transmitting, by the first remote server, the item of context-related data to the second remote server.

8. The method according to claim 1, wherein the impact corresponds to at least one of:
   a collision between the second element and the third element; and/or
   a modification of a driving parameter of the third element.

9. A system for monitoring an environment of a first element positioned on a circulation route, comprising at least a first terminal associated with the first element, the system comprises:
   at least one processor; and
   at least one non-transitory computer readable medium comprising instructions stored thereon which when executed by the at least one processor configure the system to implement a method of monitoring the environment of the first element, the method enables the system to:

detect a second element, search for the detected second element in a list of neighboring elements positioned around the first element, the neighboring elements of the list being equipped with a terminal able to implement said method, record a geolocation position of said detected second element, in response to the list not comprising the detected second element, indicating that the second element is not equipped with a terminal configured to implement said method for an environment of the second element, and determine a third element, for which presence of the detected second element can have an impact, in response to the list not comprising the detected second element.

10. A non-transitory recording medium readable by a computer on which is recorded a computer program comprising instructions for execution of a method for monitoring an environment of a first element positioned on a circulation route, when the instructions are executed by a processor of a system comprising at least a first terminal associated with the first element, wherein the method comprises:

detecting a second element, searching for the detected second element in a list of neighboring elements positioned around the first element, the neighboring elements of the list being equipped with a terminal able to implement said method, in response to the list not comprising the detected second element, indicating that the second element is not equipped with a terminal configured to implement said method for an environment of the second element:

recording a geolocation position of said detected second element, and determining a third element, for which presence of the detected second element can have an impact.

\* \* \* \* \*